US008880505B2

(12) United States Patent
Shmueli et al.

(10) Patent No.: US 8,880,505 B2
(45) Date of Patent: *Nov. 4, 2014

(54) METHOD AND COMPUTER PROGRAM FOR EVALUATING DATABASE QUERIES INVOLVING RELATIONAL AND HIERARCHICAL DATA

(71) Applicants: Oded Shmueli, Nofit (IL); Royi Ronen, Jerusalem (IL)

(72) Inventors: Oded Shmueli, Nofit (IL); Royi Ronen, Jerusalem (IL)

(73) Assignee: Technion Research and Development Foundation Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,110

(22) Filed: Jun. 18, 2013

(65) Prior Publication Data
US 2013/0282694 A1    Oct. 24, 2013

Related U.S. Application Data

(62) Division of application No. 12/679,907, filed as application No. PCT/IL2008/001306 on Sep. 28, 2008, now Pat. No. 8,495,055.

(60) Provisional application No. 60/976,482, filed on Oct. 1, 2007.

(51) Int. Cl.
*G06F 17/30*    (2006.01)

(52) U.S. Cl.
CPC .... *G06F 17/30466* (2013.01); *G06F 17/30498* (2013.01); *G06F 17/30545* (2013.01)
USPC ...................................................... 707/714

(58) Field of Classification Search
CPC ................... G06F 17/30466; G06F 17/30545
USPC .......................................... 707/714, 765, 769
See application file for complete search history.

(56) References Cited

U.S. PATENT DOCUMENTS

| 5,608,904 | A  * | 3/1997 | Chaudhuri et al. | .................... 1/1 |
| 8,359,342 | B2 * | 1/2013 | Fiebig et al. | ................... 707/830 |
| 2007/0043702 | A1 * | 2/2007 | Lakshminarayanan et al. | .. 707/3 |
| 2010/0005108 | A1 * | 1/2010 | Fiebig et al. | ................... 707/100 |

OTHER PUBLICATIONS

Flesca, S. et al., "On the Minimization of Xpath Queries" in Proceedings of the 29th VLDB Conference, Berlin, Germany, 2003, 12 pages.*
Mandhani, B. and Suciu, D., "Query Caching and View Selection for XML Databases," in Proceedings of the 31st VLDB Conference, Trondheim, Normay, Aug. 30-Sep. 2, 2005, pp. 469-480.*
Nurmi, Ville V. and Sustretov, Nmitry (Eds.), "Proceedings of the Twelfth ESSLLI Student Session" Dublin Ireland, Aug. 6-17, 2007.*

* cited by examiner

*Primary Examiner* — Sheree Brown
(74) *Attorney, Agent, or Firm* — Soroker-Agmon

(57) ABSTRACT

A method and apparatus for resolving conjunctive queries, comprising relational predicates and external predicates, such as XML predicates. The method and apparatus obtain results from a relational engine or from an external engine, and then use the obtained results as input for the other engine, so as to optimize the activity of the other engine. The process may repeat further times, with the results obtained by the other engine being input to the first engine. The method and apparatus further disclose handling value, being isomorphic hierarchical subtrees.

18 Claims, 7 Drawing Sheets

| 100 | Colum-Based On-demand Evaluation |
|---|---|
| 101 | while there exist untreated expression predicates do |
| 102 |     for each distinguished variable $W$ s.t. $B_W$ does not exist do |
| 103 |         create $B_W$ by projecting treated relations which have $W$ in their schema on |
| 104 |         $W$ and intersecting; |
| 105 |     end for |
| 106 |     $P \leftarrow \{exp_i[X, Y] \mid X \text{ is distinguished}\}$; |
| 107 |     choose $exp[X, Y]$ from $P$ s.t. $|B_X|$ is minimal; |
| 108 |     populate$(B_X, exp)$ //see procedure populate below; |
| 109 |     $B_X \leftarrow B_X \cap \Pi_X(exp)$ |
| 110 |     if $B_Y$ exists then |
| 111 |         $B_Y \leftarrow B_Y \cap \pi_Y(exp)$ |
| 112 |     end if |
| 113 |     mark $exp$ as treated; |
| 114 |     if $P$ is empty then |
| 115 |         arbitrarily choose an untreated expression predicate $exp[Z, W]$; //an orphan |
| 116 |         create $B_Z$ with all the nodes in the XML document; |
| 117 |         populate$(B_Z, exp)$; |
| 118 |         mark $exp$ as treated; |
| 119 |     end if |
| 120 | end while |
| 121 | output $\pi_V((\text{JOIN}_{1 \leq i \leq n}(q_i)) \text{JOIN}(\text{JOIN}_{1 \leq i \leq m}(exp_i)))$; |
| 122 | |
| 123 | procedure populate (unary relation $B_X$, expression predicate $exp$) |
| 124 |     for each $x$ in $B_X$ do |
| 125 |         $R_x \leftarrow \{r \mid r \text{ is in the result set of } exp \text{ when evaluated at } x\}$ |
| 126 |         $exp \leftarrow exp \left[ \{(x, r) \mid r \text{ IN } R_x\} \right.$; //the tuples $(x, r)$ are added to $exp$ |
| 127 |     end for |

Fig. 1B

| | |
|---|---|
| 200 | Join Based On-demand Evaluation |
| 201 | $J \leftarrow$ join of all the relations corresponding to predicates $q_i$ |
| 202 | $J \leftarrow project(J)$   //see procedure project below |
| 203 | while there exist untreated predicates do |
| 204 |     compute $\{exp_i[X, Y] \mid X \text{ is in } J\text{'s schema}\}$ and partition to $T_1$ (if type 1) |
| 205 |     and $T_2$ (if type 2) |
| 206 |     while $T_2$ is not empty do |
| 207 |         arbitrarily remove an element $exp[X, Y]$ from $T_2$ |
| 208 |         populate($\pi_X(J)$,exp) //same as in Alg.0.1 |
| 209 |         mark exp as treated |
| 210 |         $J \leftarrow project(J \bowtie exp)$ |
| 211 |     end while |
| 212 |     if $T_1$ is not empty then |
| 213 |         arbitrarily remove an element $exp[X, Y]$ from $T_1$ |
| 214 |         populate $(\pi_X(J), exp)$ |
| 215 |         mark $exp$ as treated |
| 216 |         $J \leftarrow project(J \bowtie exp)$ |
| 217 |     else |
| 218 |         arbitrarily choose an expression predicate $exp[X, Y]$ |
| 219 |         create $B_X$ with all the nodes in the XML document; |
| 220 |         populate($B_X$,exp) |
| 221 |         mark exp as treated |
| 222 |         $J \leftarrow project(J \bowtie exp)$ |
| 223 |     end if |
| 224 | end while |
| 225 | output $\pi_V(J)$ |
| 226 | |
| 227 | |
| 228 | procedure project (relation J) |
| 229 |     $A \leftarrow \{\text{variables in } V\} \cup \{\text{variables in untreated expression predicates}\}$; |
| 230 |     return $\pi_{a \in A}(J)$; |

Fig. 2

| | |
|---|---|
| 300 | Quick On-demand Evaluation |
| 301 | $i \leftarrow 0$ |
| 302 | while there exist untreated predicates do |
| 303 | • build the relational untreated predicates graph G; |
| 304 | • if there are untreated expression predicates but none of the components in |
| 305 | G has expression predicates associated with it then |
| 306 | ○ artificially assign an arbitrary expression predicate to one of the |
| 307 | components; |
| 308 | ○ //orphan treatment |
| 309 | ○ $c \leftarrow A(G)$; |
| 310 | end if |
| 311 | if all the untreated predicates are relational then |
| 312 | $c \leftarrow$ all untreated relations; //note that they are all relational |
| 313 | end if |
| 314 | build rule $r_i$ by putting in the body the predicates in c and the expression |
| 315 | predicates associated with c (if any). $r_i$'s head consists of the |
| 316 | variables in the rule's body which are also in either (1) any |
| 317 | untreated predicate, or (2) the original rule's head, or (3) in $J_{i-1}$, if |
| 318 | exists; |
| 319 | $J_i \leftarrow$ Join-Based On-Demand($r_i$); //JBOD marks predicates as treated |
| 320 | create $K_i$ from $J_i$ and add the corresponding predicate $k_i$ to the original |
| 321 | rule, marked as untreated; |
| 322 | $i \leftarrow i + 1$ |
| 323 | end while |
| 324 | $l \leftarrow i - 1$ |
| 325 | while $l > 0$ do |
| 326 | $J_{l-1} \leftarrow$ project2($J_l$)on$J_{l-1}$; |
| 327 | $l \leftarrow l - 1$ |
| 328 | end while |
| 329 | output $\pi_v (J_0)$ |

Fig. 3

```
500
501
502  Column-based on-demand algorithm
503  mark relational predicates as permanently treated and expression predicates as temporarily treated;
504  while fixpoint has not been reached do
505     for each rule r in the program do
506          mark temporarily treated predicates as untreated;
507          extendExpRel(r)
508          for each relation P corresponding to an IDB or XPath predicate p in r do
509               let ΔP be the tuples added to P since the start of the last evaluation of r;
510               evaluate r with ΔP replacing P;
511          end for
512     end for
513  end while
514
515  extendExpRel(rule r) //Populates expression relations using a superset of bindings to their first
516                         argument.
517  while there exists an untreated predicate do
518       G←{exp_i[X, Y ] | X is distinguished};
519       if G is empty then
520            arbitrarily choose untreated exp. pred. exp[Z,W];
521            create B_Z with all the nodes in the document;
522            populate(B_Z,exp[Z,W]); //orphan predicate
523            mark exp[Z,W] as permanently treated;
524       else
525            for each distinguished variable X do
526                 B_X←createBindingColumn(X);
527                 for each exp_i[X, Y ] 2 G do
528                      populate(B_X,exp_i[X, Y ]);
529                      mark exp_i[X, Y ] as temporarily treated;
530                 end for
531            end for
532       end if
533  end while
534
535  populate(column B_X, exp. pred. exp) // Populates the relation Exp
536                          with the values in B_X as candidates for the first column.
537  for each x in B_X \ Exp^t do
538       R_x ←{n | exp evaluated at x yeilds n};
539       Exp←ExpU{(x, n)|n IN R_x };
540  end for
541  Exp^t←Exp^t U B_X;
542
543
```

Fig. 5A

500
501
502
503    createBindingColumn(variable X)
504    Creates $B_X$ by adding X values not sent to the XPath processor, coming from new tuples.
505    D←d|d is a treated relation with X in its schema}
506    for each d in D do
507        let Δd contain tuples added to d as of the start of the last iteration of the while loop of the
508            Column-based on-demand algorithm
509        for each c in D \ {d} do
510            Δd ← $\pi_x$ (Δd)∩ \ $\pi_x$ (c)
511        end for
512        $B_X$ ← $B_X$ U Δd$_i$;
513    end for

METHOD AND COMPUTER PROGRAM FOR EVALUATING DATABASE QUERIES INVOLVING RELATIONAL AND HIERARCHICAL DATA

RELATED APPLICATIONS

This application claims priority under 35 U.S.C. 120 as a divisional of application Ser. No. 12/679,907 filed Mar. 25, 2010. The disclosure of which is incorporated herein by reference.

FIELD OF THE INVENTION

The present invention relates to database queries in general, and to a method and apparatus for evaluating queries involving relational and hierarchical data, in particular.

BACKGROUND

Relational databases and related utilities are well established and are used for many years now in applications and systems related to almost all areas of everyday life, including commerce, finance, and others. In recent years, additional technologies such as XML, have permeated into multiple areas as well, and applications using such techniques are widespread, especially for certain types of computerized applications, and in particular applications involving the Internet.

Some products integrate or use relational database systems side by side with XML or other data type systems, wherein each data type is stored and handled in the more appropriate manner.

In such systems, there is often a need for handling joint conjunctive queries, i.e., queries involving elements of relational data with elements of XML data at the same time. Activating a relevant engine for each data type, followed by combining the results, is inefficient and involves significant redundant work, since no engine can easily utilize results of the other engine, and hence the resulting performance is poor.

On the other hand, developing a specific query language for arbitrary systems combining two or more data sources implies significant redundant development work, since efficient engines already exist for handling each type of data.

There is thus a need in the art for a method and apparatus for resolving conjunctive queries, in a manner that will combine the utilization of existing systems, with the ability to use each system in an efficient manner, so as to minimize development work as well as provide high efficiency. There is also a need for a method and apparatus for handling efficiently mutually dependent conjunctive queries, such as Datalog programs.

BRIEF DESCRIPTION OF THE DRAWINGS

The present invention will be understood and appreciated more fully from the following detailed description taken in conjunction with the drawings in which:

FIG. 1B is pseudo code listing of a method for a column-based on-demand algorithm for evaluating a conjunctive query;

FIG. 2 is pseudo code listing of a method for a join-based on-demand algorithm for evaluating a conjunctive query;

FIG. 3 is pseudo code listing of a method for a quick on-demand algorithm for evaluating a conjunctive query;

FIGS. 5A and 5B are pseudo-code listing of a method for evaluating a Datalog program involving relational and external predicates.

SUMMARY

Figure 1A:
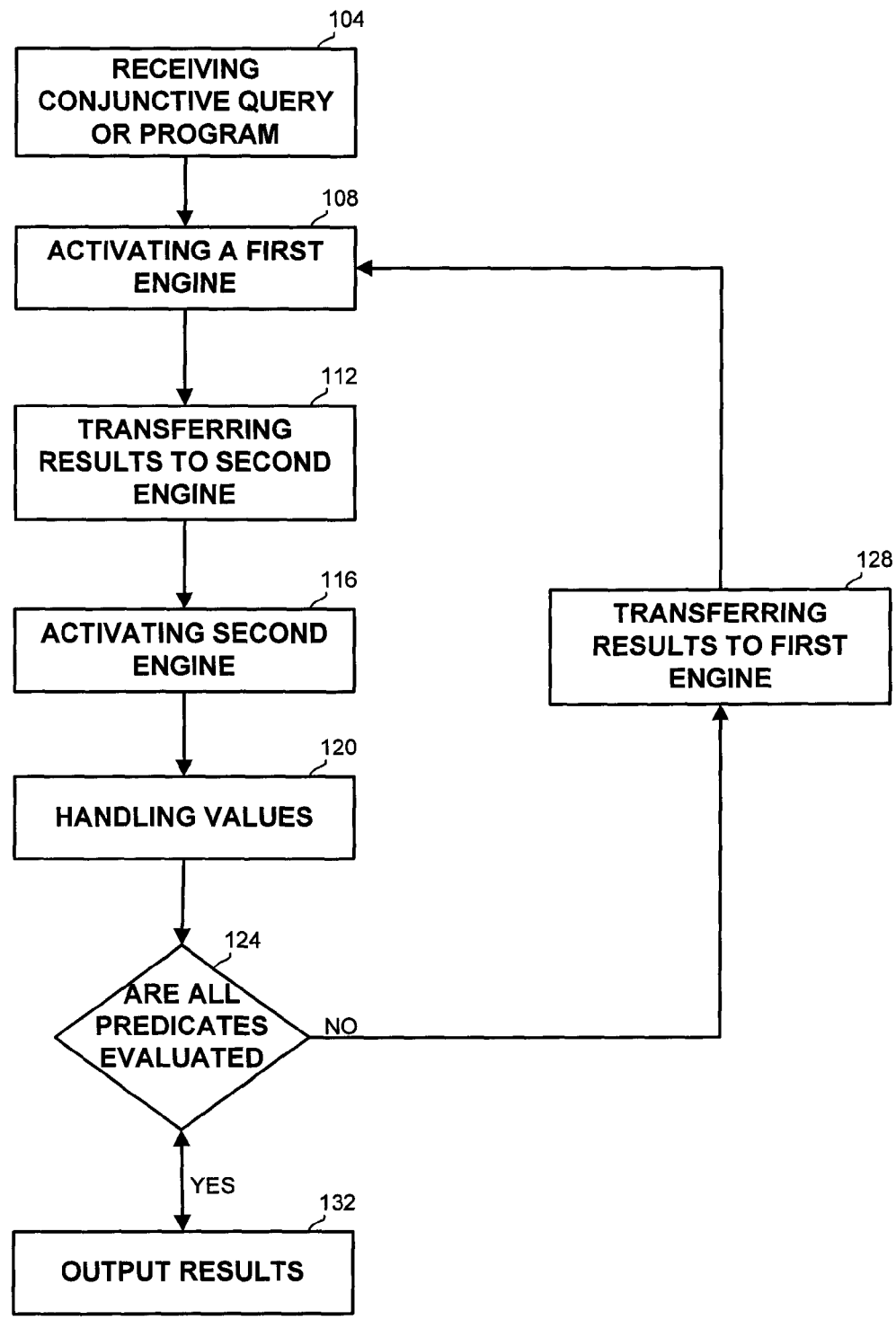
FIG. 1A is a flowchart of a preferred embodiment of a method for handling conjunctive queries.

A method and apparatus for resolving and handling a conjunctive query, comprising a relational predicate and an external, i.e. a non-relational predicate.

One aspect of the disclosure relates to a method for evaluating a conjunctive query, the conjunctive query comprising one or more first predicates, each first predicate optionally evaluated using a first engine, and one or more second predicates, each second predicate evaluated using a second engine, the method comprising the steps of: activating the first engine to evaluate the first predicates to obtain first temporary results; and activating the second engine using the first temporary results to evaluate the second predicates so as to obtain second temporary results. Within the method one of the first predicates or the second predicates are optionally a relational predicate, and one of the second predicates or the first predicates are optionally an external predicate. Within the method, one of the first engine or the second engine is optionally a relational engine, and one of the second engine or the first engine being is optionally external engine. The method can further comprise repeating the step of activating the first engine to evaluate the first predicate to obtain first temporary results. The method can further comprise repeating the steps of activating the first engine to evaluate the first predicates to obtain first temporary results, and activating the second engine using the first temporary results to evaluate the second predicates so as to obtain second temporary results. Within the method, the second temporary results are optionally the query results. Within the method, the relational engine optionally performs one or more join operations, or one or more column intersection operations, or handles one or more relational untreated predicate graphs. Within the method, the first engine and the second engine are optionally activated, and results are optionally transferred according to a column-based on-demand algorithm, a join-based on-demand algorithm, or a quick on-demand algorithm. Within the method, the external predicate is optionally an XML predicate. Within the method, the external is optionally an XPath engine. Within the method, the relational predicate is optionally selected from the group consisting of: a logic predicate having a relational symbol, a relational algebraic expression, an SQL statement, a value predicate, and an expression evaluable against a relational database. Within the method, the external predicate is optionally selected from the group consisting of: a predicate against an XML file expressed in an XML query language, and a predicate against a semantic web database expressed in a query language. The method can further comprise a step of treating a value of a hierarchical structure. Within the method, the values are optionally isomorphic hierarchical structures.

Another aspect of the disclosure relates to a method for evaluating a program, the program comprising one or more conjunctive queries, each conjunctive query comprising one or more first predicates which can be evaluated using a first engine, and one or more second predicates which can be evaluated using a second engine, the method comprising the steps of: activating the first engine to evaluate the first predicates to obtain first temporary results; and activating the second engine using the first temporary results to evaluate the second predicates so as to obtain second temporary results. Within the method, optionally one of the first predicates or the second predicates is a relational predicate, and one of the second predicates or the first predicates is an external predicate. Within the method, optionally one of the first engine or the second engine is a relational engine, and one of the second engine or the first engine is an external engine. Within the method, the program is optionally an XpathL program or a Datalog program with one or more external Xpath predicates. Within the method, the relational engine optionally performs a column-based on-demand algorithm. Within the method, the program is optionally a recursive program. The method is optionally performed as an extension of a semi-naïve method for evaluating a recursive program. Within the method, the first engine or the second engine are activated ad-hoc for evaluating the conjunctive query, or by a system providing the conjunctive query.

Yet another aspect of the disclosure relates to an apparatus for evaluating a program, the program comprising one or more conjunctive queries, each conjunctive query comprising one or more first predicates which can be evaluated using a first engine, and one or more second predicates which can be evaluated using a second engine, one of the first predicates or the second predicates being a relational predicate, and one of the second predicates or the first predicates being an external predicate, the apparatus comprising: a database interface for interfacing with a relational database; a relation loader for creating one or more relations and loading through the database interface one or more values into the relations from the relational database; a parser for parsing the conjunctive queries or the program; an external processor for evaluating the external predicates; and an evaluation manager for evaluating one or more results returned from the external processor or one or more results returned from the database interface. Within the apparatus, optionally one of the first engine or the second engine is a relational engine, and one of the second engine or the first engine is an external engine. Within the apparatus, the evaluation manager optionally comprises a rule evaluator for evaluating one or more rules. Within the apparatus, the evaluation manager optionally comprises an SQL generator for creating one or more auxiliary queries.

Yet another aspect of the disclosure relates to a computer readable storage medium containing a set of instructions for a general purpose computer, the set of instructions comprising: activating a first engine to evaluate one or more first predicates, the first predicates being a part of a query comprising also one or more second predicates, to obtain first temporary results; and activating a second engine using the first temporary results to evaluate the at second predicates so as to obtain second temporary results.

DETAILED DESCRIPTION

A method and apparatus for combining relational query predicates with external query predicates so as to optimize execution of the query. Relational predicates may relate to a logic predicate containing a relational symbol, preferably expressed in lower letters, to a relational algebra expression, to an SQL statement, or to any other query evaluable against a relational database. External predicate relates to a non-relational predicate. An external predicate can be a predicate against an XML file expressed in XQuery, Xpath or any other XML query language, or a predicate against some other resource such as semantic web database expressed in a query language for that resource.

The results obtained from engines handling predicates of one type, are used to narrow the search for predicates of the other type. Then the results of the other engine are optionally returned to the first engine, and so on until all predicates are evaluated. Relational databases are usually accessed by relational queries, wherein external databases, such as Extended Markup Language (XML) databases are accessed, for example, by XPath queries. As hybrid databases, such as relational-XML databases, are becoming more popular, the need rises for a query language that will utilize the benefits of both sources. Building a dedicated query language for hybrid databases is costly and may not best utilize existing systems. On the other hand, executing queries of both types and then unifying the results is wasteful in time, memory or other resources. In addition, the predicates, or the separate queries making up a conjunctive query, are not independent but may influence each other, thus their execution order can not be arbitrary. The disclosed subject matter teaches methods and apparatus for executing combined queries. One preferred embodiment suggests the use of conjunctive queries, wherein a number of specific embodiments are disclosed. Another preferred embodiment teaches the execution of recursive queries.

The workload distribution between the engines may optionally depend on one or more of multiple factors, including but not limited to the efficiency of each type of engine, the relative size of the relevant database, i.e. the ratio between the size of the relational database and the size of the external database, the communication cost to each database and others. For example, if communication with the external database is expensive, for example because it is located in a remote location, then it is preferable to employ an evaluation engine which possibly takes more processing resources but returns fewer results, which are then passed to the external engine. If, on the other hand communication is cheap, or the external database is more efficient than the relational database, then it might be beneficial to employ a faster relational engine which returns more results, transfer the results to the external engine and have the external engine narrow the results. If usage of the external database is subject to payment or is a distributed database, then again it is desirable to limit the execution time of the external database, and activate a more intensive algorithm on the relational database so as to limit the number of results transferred to the external engine to reduce its workload.

Referring now to FIG. 1A, showing a flowchart of a preferred embodiment of a method of the current disclosure. On step 104 a conjunctive query is received. The conjunctive query can be received in the form of a file, wherein the fie is generated manually by a user or automatically by a program, application or the like. Alternatively, conjunctive query can be received in the form of a stream, such as an input stream entered by a user, an input stream generated by a program or any other option, The conjunctive query comprises one or more relational predicates and one or more external predicates. On step 108 a first engine is activated to handle one or more of the predicates. For example, if the handled predicates are relational predicates, then a relational engine is activated, and if the handled predicate is an external predicate than an external engine is activated. In one embodiment, the first engine, and then additional components as required are deployed ad-hoc upon receiving the query. In another embodiment, the first engine, as well as other components are deployed by another system and are responsive to input received from the system or form another source.

On step 112 the results obtained by the first engine are transferred to the second engine, for handling one or more of the second predicates. If the first engine is a relational engine, then the second engine is the external engine, and vice versa.

On step 116 the second engine is activated. On step 124 it is determined whether all predicates have been resolved. If yes, on step 132 the results are output. Otherwise the results of the second engine are transferred to the first engine on step 128, and the required steps out of steps 108, 112, and 116 are repeated. On optional step 120, values, being isomorphic subtrees are handled in order to optimize the execution of external engines handling hierarchic structures.

The various options for activating engines using results obtained by other engines are detailed in association with FIG. 1B, FIG. 2, and FIG. 3 below.

Referring now to FIG. 1B, FIG. 2 and FIG. 3, showing pseudo-code listings implementing preferred embodiments for evaluating conjunctive queries, wherein FIG. 1 discloses a column-based on-demand method, FIG. 2 discloses a join-based on-demand method, and FIG. 3 discloses a quick on-demand method. In the join-based on-demand algorithm, the relational evaluation engine performs multiple join operations, which are relatively expensive. Thus, the relational evaluation engine returns fewer results, thus making the join-based algorithm suitable for cases in which transferring the results to the external engine is expensive, or in which the external engine is less efficient. In the column-based on-demand algorithm, the relational evaluation engine performs multiple column intersections which is a relatively cheap operation, but possibly returns more results to be sent to the external engine. The quick on-demand method improves on the join-based on-demand algorithm so as to reduce the number of results, and thus the cost of transferring the results to the external engine.

Referring now to FIG. 1B, showing pseudo-code listing for a column-based on-demand method for evaluating a conjunctive query comprising one or more relational predicates and one or more external predicates such as Xpath predicates. The column-based on-demand method performs multiple conjunction operations, thus obtaining relatively many results which are then passed to the XPath predicate processor.

The input to the method shown on FIG. 1B is a combined rule:

$$h(V) \leftarrow q_1(U_1), q_2(U_2), \ldots, q_n(U_n), \exp_1[W_{11}, W_{12}], \exp_2[W_{21}, W_{22}], \ldots, \exp_m[Wm1, Wm2]$$

wherein $q_1 \ldots q_n$ represent relational predicates involving variables and constants vectors $U_1 \ldots U_n$, and $\exp_1, \exp_2, \exp_m$ are external predicates, such as XML predicates involving variables $W_{ij}$. The predicate h is called the query's head, and its arguments are the elements of the vector V (of size v) involving variables and constants. The output is an relation h of arity v with tuples that represent the query results.

The column-based on-demand algorithm shown in FIG. 1B populates expression relations by considering known super-sets of bindings to their first argument. Initially, only relational predicates are marked as treated. A variable X is said to be distinguished at a certain point in time if X is a first variable in an at least one untreated expression predicate, and X appears as an argument in a treated predicate. The main "while" loop is repeated until all predicates are treated. In the main loop, for every new distinguished variable X there is a unary relation $B_X$. $B_X$ is called X's binding column, and it contains a superset of the possible binding of nodes to X. $B_X$ is assigned the intersection of projecting the attribute X from all the treated relations having X in their schema. Values that are not in this intersection can not be a satisfying substitution for X. Therefore, expression relations whose first argument is the variable X need not be populated with tuples whose first element is not in $B_X$. Expression predicates whose first argument has a binding column are populated by evaluating the XPath expression of the predicate on the elements in the binding column. After an expression relation exp[X,Y] is populated it is marked as treated. Denote by Exp be the relation corresponding to the predicate exp (as a convention, a relation corresponding to a predicate is denoted by the predicate's name with the first letter capitalized). Observe that $\pi_x(\text{Exp}) \subseteq B_X$ since evaluating exp on elements of $B_X$ may have an empty result set. Therefore, at this point $B_X$ is updated, i.e., $B_X \leftarrow B_X \cap \pi_x(\text{Exp})$. If $B_Y$ exists, it is also updated, i.e., $B_Y \leftarrow B_Y \cap B_Y \setminus \pi_Y(\text{Exp})$. The basic on-demand algorithm populates one expression relation at a time. It populates one of the expression relations whose first argument has the smallest binding column. If at any point there are no distinguished variables but there are untreated predicates, an arbitrary untreated expression relation $e_0[Z,W]$ is chosen, such a predicate is termed an orphan. A binding column $B_Z$ containing all the nodes in the XML document is created, and the algorithm continues.

Referring now to FIG. 2, showing a code listing for a join-based on-demand method for evaluating a conjunctive query comprising one or more relational predicates and one or more external predicates such as an XPath predicate. The input and output are the same as for the column-based on-demand algorithm. Even though basic on-demand typically avoids populating expression relations with many unnecessary tuples, it may still populate expression relations with a significant number of unnecessary tuples. Join-based on-demand evaluates the input query after populating expression relations with only subsets of the tuples, generated by column-based on-demand algorithm. On the other hand, the basic algorithm performs join operations before populating. Initially, only relational predicates are marked as treated. The join-based on-demand algorithm starts by joining all the treated relations, which are at this point the relations $q_i$, into a relation J. J is projected on the attributes of the query's head and of untreated expression predicates, and the result is assigned back to J. Then, all the expression relations whose first argument is in J's schema are partitioned to two sets, $T_1$ and $T_2$. $T_1$ consists of expression predicates whose first argument is a variable which belongs to J's schema and whose second argument does not. $T_1$ expression predicates are named type 1 predicates with respect to J. $T_2$ consists of expression predicates whose first and second arguments belong to J's schema. $T_2$ expression predicates are named type 2 predicates with respect to J. The elements in $T_2$ are considered first. Each element is populated. Instead of using a binding column, join-based on-demand algorithm uses the projection of J on the first attribute of the populated relation. The populated relation is semi-joined, with J, and the result replaces J. J is again projected on the attributes of the query's head and of untreated expression predicates, and the result is again assigned to J. Type 2 predicates are processed first because they are likely to eliminate from J more tuples than type 1 predicates will, since given a binding $x_0$ from J for the first argument of a type 1 predicate, its expression only needs to be satisfied at $x_0$ in order not to eliminate $x_0$ from J. However, given a type 2 predicate, such as exp[Z,W], and a binding $z_0$ from J, in order not to eliminate a tuple from J, exp[Z, W] needs to be satisfied at $z_0$, and the result set has to include a value which appears with $z_0$ in the same tuple in J. This is done since it is desirable to reduce the size of J as much as possible and as early in the evaluation as possible, since J's projections are used to populate expression relations. A smaller J implies fewer calls to the XPath processor and potentially less tuples materialized in joins. When set $T_2$ is exhausted, one predicate from $T_1$ is populated, joined with J, projected on the attributes of both the head and of untreated expression predicates and the result is assigned back to J. After this join, $T_1$ and $T_2$ have to be re-determined. Again, $T_2$ predicates receive higher priority. If $T_1$ and $T_2$ are both empty, and there are still untreated predicates, an untreated predicate (an orphan) is arbitrarily chosen and populated by evaluating its expression at every node in the tree. The resulting relation is joined with J, $T_1$ and $T_2$ are recomputed, and the algorithm continues until all predicates are treated.

Referring now to FIG. 3, showing a code listing for a quick on-demand method for evaluating a conjunctive query comprising one or more relational predicates and one or more external predicates such as an Xpath predicate.

The input to the quick on-demand algorithm is the same as the input for the column-based and join-based on-demand algorithm. However, all predicates are initially marked as untreated. In addition, an algorithm A is provided, which extracts from an input graph, nodes belonging to a connected component having a non-empty set of expression relations associated with it. The output is the same as for the algorithms of FIG. 1B and FIG. 2. The quick on-demand algorithm consists of improvements to the join-based on-demand algorithm detailed in association with FIG. 2 above, the improvements aimed at reducing the size and number of tuples materialized during evaluation. Given an input query, the relational untreated predicate graph is defined to be the following graph: every untreated relational predicate is a node. An undirected edge exists between every two nodes which share at least one variable. Each connected component in the graph is associated with the set of expression predicates whose first argument is a variable which appears in one of the predicates in the component.

Given a rule r, all predicates are initially marked as untreated. The algorithm starts by building the relational untreated predicates graph. Then, using algorithm A, which is an input to the quick algorithm, a set of nodes $c_0$, whose elements are the nodes in one connected component, is extracted from the graph. Algorithm A is required to build the set only from a component with a non-empty set of expression relations associated with it. Then, a rule $r_0$ is built as follows: $r_0$'s body consists of the relational predicates in $c_0$ and the associated expression predicates. $r_0$'s head consists of the variables which appear in the body and are in any untreated predicate, or in the original rule's head. $r_0$ is provided as input to the join-based on-demand algorithm presented above. The predicates comprising r's body are marked as treated. The result of the i-th call to join-based on-demand is termed $J_i$, and the initial result is termed $J_0$. $J_0$ is projected on all the attributes in the untreated predicates, the result being named $K_0$. $k_0$, a predicate corresponding to $K_0$ is added to r, and is marked as untreated. The relational untreated predicates graph is built again, a set of nodes $c_1$ (corresponding to another connected component) is extracted, and a rule $r_1$ (as well as all rules $r_i$ where i>0) is built in the same manner as $r_0$, however with the difference that the variables appearing in its head are variables which appear in the body and are also in any untreated predicate, or in the original rule's head or in $J_0.r_1$'s body predicates are marked as treated, and sent to the join-based on-demand algorithm. The result, $J_1$, is projected to produce $K_1$, and the corresponding predicate $k_1$ is added to r. The graph is built again, and the process repeats until all the predicates are marked as treated.

If at any point none of the connected components has expression predicates associated with it, but there are untreated expression predicates (orphans), one connected component and one orphan predicate are artificially associated and the algorithm continues.

If at any point none of the connected components has expression predicates associated with it and all the expression predicates are treated, a rule $r_{relational}$ is constructed. $r_{relational}$'s body consists of all the untreated predicates. $r_{relational}$'s consists of all the variables in the body. $r_{relational}$ is sent to the join-based on-demand algorithm. The result is stored in relation $J_i$, (where i indicates the number of the call to JBOD) After evaluation, no untreated predicates exist.

An operation $project_2$ is defined on a relation $J_i$ where i>0. $project_2 (J)$ is defined as the projection of $J_i$ on the union of the following attribute sets: (1) the variables in the rule's head; and (2) the variables in $J_{i-1}$. For each relation $J_i$, starting with the relation in which i is maximal, $project_2 (J)$ is performed, and the results are joined with $J_{i-1}$. The result is assigned to $J_{i-1}$ and the process continues. When reaching $J_0$, instead of performing $project_2$, (which is undefined for $J_0$), $J_0$ is projected on the head variables. The result is added to the relation corresponding to the head's predicate.

Orphan predicates are preferably treated in column-based and join-based on-demand algorithms, by arbitrarily choosing one such predicate, if any exists, and proceeding with the algorithm. However, different choices as for which orphan predicate is to be handled first can lead to different behaviors. For example, in the following query, and in association with an arbitrary database instance: res(Z)←a/b[W,Z], b/c[Z,X], in which both predicates in the body of the query are orphans. If a/b[W,Z] is handled first, and a/b is evaluated at all the nodes in the document as context nodes. In the column-based on-demand method, a binding column $B_Z$ is created because of the untreated predicate b/c[Z,X], and the corresponding relation is populated using $B_Z$. However, if b/c[Z,X] is treated first, then there is no binding column for W, and the relation corresponding to a/b[W,Z] is populated by evaluating a/b at all the nodes in the XML document. A similar behavior is observed in the join-based on-demand method. If a/b[W,Z] is treated first, then W is in J and populating a/b[W,Z] does not necessitate evaluating a/b at all the nodes in the document, unlike the other case).

The following method is used in an effort to avoid evaluating expressions at every node in the tree: an orphan graph is constructed, in which every orphan predicate is represented by a node. A directed edge is constructed between orphans $o_1$ and $o_2$ if $o_1$'s second argument is the same as $o_2$'s first argument. For example, the orphan graph for the example above is: a/b[W,Z]→b/c[Z,X]. Then, the graph is topologically sorted. A relation corresponding to a source of the sorted graph having the largest number of descendants, is populated and then the main algorithm proceeds. The descendants should not be treated as orphans any more. In the example above, a/b[W,Z] is the only source. Once it is populated, b/c[Z,X] is no longer an orphan, since Z has a binding column (in the column-based algorithm, or appears in J's schema (in join-based method). This approach can also be generalized to the quick on-demand method, wherein instead of associating an arbitrary orphan with a connected component, the source of the topologically sorted graph is associated.

The algorithms detailed above do not handle queries with negations. If one or more predicates with negations appear, the predicates can be partitioned to expression (XML) or relational as well as to positive and negative, a total of four possibilities. Negated predicates having variables which do not appear in positive variables can be trivially satisfied, for example by any string object id which is not in the EDB. It is therefore assumed that all the variables in negated predicates also appear in non-negated predicates. Each of the presented algorithms is adapted to populate expression relations in the presence of negation.

Adapting the Column-Based On-Demand algorithm for handling negation is optionally done as follows: the definition for a distinguished variable for queries with negation is generalized as follows: Variable X is distinguished at a certain point in time if X is a first variable in an at least one untreated expression relation and X appears as an argument in a positive treated predicate. This change in the definition may cause the addition of negated predicates to P, the set of predicates whose first variable is considered distinguished by the Column-Based On-Demand algorithm. The creation of a binding column for a variable X is done by projecting only positive treated relations on X, as opposed to the column-based algorithms for queries without negation, in which we defined the creation of the binding column to be done using projections from all the treated relations on X. The column-based on-demand algorithm is thus changed so that the choice of a predicate from P can be of a negated or a non-negated predicate. The rest of the algorithm remains unchanged. The execution result is that an expression relation exp is populated if predicates ¬ exp(X,Y) or exp(X,Y) appear in the rule body, based on the values in the binding column for X, created as described above. This population leads to a correct evaluation of the rule, even though only a part of exp is materialized, since $B_X$ contains all the values of X based on which tuples may be added to the relation corresponding to the rule's head ($B_X$ is the intersection of projections on X of positive treated relations). Therefore, given a predicate ¬ exp(X,Y), exp need not be checked for the existence or absence of 2-tuples whose first element is not in $B_X$, because such tuples are necessarily not a part of a satisfying assignment to the variables in the rule's body, and will not produce tuples to be added to the relation corresponding to the rule's head.

In the column-based algorithm, the relations corresponding to positive predicates are joined. Denote by I the result of this join. In the presence of negation, after joining the predicates corresponding to positive relations and producing I, every relation R corresponding to a negated predicate is considered. For each such relation I is updated as follows: I←I JOIN ($\pi_{attr(R)}$(I)\R) wherein attr(R) is the set of R's attributes. Then, the result is output as a projection.

As for the Join-Based On-Demand algorithm, in order to handle negation, a bound predicate is defined to be a predicate whose attributes are all in J's schema. $T_2$ includes bound negated expression predicates, in addition to $T_2$'s contents as defined for the positive case. In the absence of negation, after populating an expression relation exp(X,Y), J is updated by joining J with exp and applying the procedure project on the result. If the populated relation is negated, ¬ exp(X,Y), then the update operation is the is following: J Semi-Join ($\pi_{XY}$(J)\EXP) is computed, the result is projected on the variables of the query's head and on the variables if untreated predicates, and assigned to J. This update operation is also performed for negated relational predicates which become bound in the course of evaluation.

Adapting the quick on-demand algorithm for handling negation is based on the join-based on-demand algorithm. During evaluation, the quick algorithm ignores negated non-bound predicates. When a negated predicate becomes bound, the algorithm considers it to be a part of the connected components in the graph and as a candidate to be associated with such components (in case it is an expression predicate). Bound predicates are therefore sent to the join-based on-demand algorithm which handles them for the quick algorithm.

FIGS. 1-3 disclosed preferred embodiments of methods for evaluating conjunctive queries comprising XPath predicates as well as relational predicates. However, there is a need for evaluating extended programs, in which handled rules affect other rules. This is Datalog extended with XPath predicates, a language referred to as $XPath^L$. In a preferred embodiment, Datalog programs enhanced with XML expressions are handled.

Figure 4:
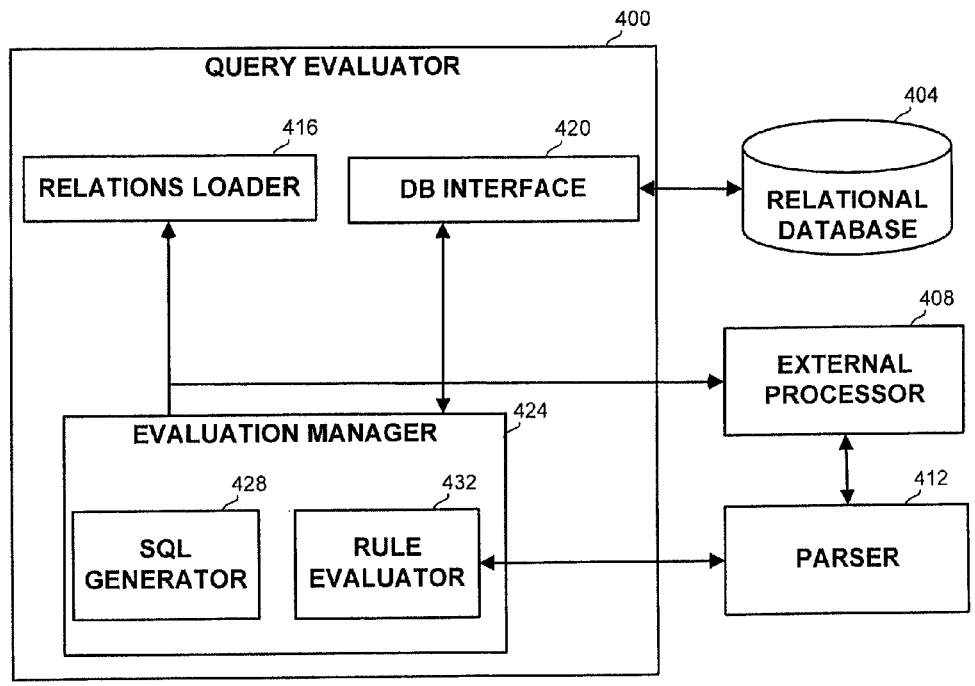
FIG. 4 is a schematic block diagram of an apparatus for evaluating a program involving relational and external predicates.

Referring now to FIG. 4, showing a preferred embodiment of an apparatus for handling extended queries or programs in rum-time. The queries or programs may be introduced to the apparatus in one or more files, whether generated by a human or by a computer program. Alternatively, the query can be represented as a stream, which may also be generated manually or automatically.

The apparatus can be deployed ad-hoc for resolving a query, In yet another embodiment, the apparatus for handling a query can be integrated and deployed as a part of another system which generates or receives the queries or programs. A query is optionally represented as an XML stream or document, which is parsed by parser 412, and which external processor 408, for example an XML query processor such as an XPath processor, processes into data structures representing the executed program. Relations loader 416 is responsible for creating for predicate val, a relation val and the relations corresponding to the XPath predicates. Relations loader 416 populates the relations with tuples, using external processor 408 and parser 412 for parsing the queries. Populating is done using any algorithm, for example the on-demand algorithm detailed in association with FIG. 5 below. Theoretically an infinite number of built-in relations exist, one for every possible expression, called expression relations. However, with respect to a particular XML document and one query, there is a finite number of such relations, each relation having a finite number of tuples. Denote by m the number of nodes in the XML document, relation Val comprises m tuples in which the first element is an ID of a node from the original document, and an expression relation has at most $m^2$ such tuples. In addition, Val and expression relations have tuples in which the first element is one of the $O(m^2)$ objects that are descendants of value objects, which are each an object dedicated to represent the value of a node in the XML document. The on-demand algorithm populates these relations based on known binding to variables at run time. Database interface 420, such as an SQL interface, executes relations-related operations. Relations loader 416 uses database interface 420 to load tuples into the built-in relations, and evaluation manager 424 uses this interface to query and update relations. Evaluation Manager 424 handles the evaluation process. First, it creates the intensional database (IDB) relations, i.e., relations corresponding to rules' head predicates, which are initially empty. Only programs in which negation is stratified are considered. Evaluation manager 424 then evaluates the query by considering the strata in a bottom up fashion, i.e. from lowest to highest. Each stratum is evaluated by repeatedly evaluating the stratum's rules, until a fixpoint is reached. The evaluation can be performed by rule evaluator 432 designed for evaluating the rules, using the evaluation technique detailed in Principles of Database and Knowledge Base Systems, Vol. I, II, C.S. Press, Rockville, Md., 1989, by J. D. Ullman. When the highest stratum reaches a fixpoint, evaluation of the query is complete. SQL Generator 428 creates the queries which retrieve the satisfying bindings for the variables of the rule and updates the relevant relations using these bindings. The output of the query program, as well as intermediate results, is contained in one or more table(s) in relational database 404. The detailed apparatus is preferably comprised of one or more software components executed by a computing platform such as a personal computer, a computer cluster, a distributed computer system or a mainframe computer. Database 404 can be local or remote to the computing platform. The components can be developed in any programming language, such as C++ or Java and under any development environment. The apparatus preferably uses the Jaxen XPath processor as external processor 408 and the MySQL RDBMS as database 404.

Evaluation manager 424 can be implemented using a static approach or an on-demand approach. The on-demand approaches are generalizations of the approaches disclosed in FIGS. 1-3 above. A code listing demonstrating the on-demand approach is disclosed in FIGS. 5A and 5B.

Referring now to FIGS. 5A and 5B, showing pseudo-code for a column-based on-demand method. The input to the method is an $XPath^L$ program, and the output comprises populated IDB relations. The algorithm is an extension that allows the semi-naive method for evaluation of Datalog queries mentioned in association with FIG. 4 above to work efficiently with XML predicates. A rule r in a possibly recursive program may have to be evaluated multiple times. Before each evaluation of r, the column-based on-demand algorithm incrementally populates the expression relations, by calling the extendExpRel procedure on line 506. The procedure is detailed starting on line 514. The relational predicates $q_i$ are marked as permanently treated. Evaluation is started with empty expression relations. The column-based on-demand algorithm incrementally populates the relations by considering supersets of possible bindings to their first argument. A variable X is called distinguished at a certain point in time if X is a first variable in an at least one untreated expression predicate and X appears as an argument in a permanently or temporarily treated predicate. Procedure extendExpRel is performed before each rule evaluation. For each distinguished variable W, a unary relation $B_W$ (W's binding column) is built as follows:

The treated relations whose schema includes W (referred to as the distinguished relations) are considered. From each such relation the new tuples added to it since the last evaluation of the rule are selected. The intersection of these selected tuples with the intersection of the projections of the rest of the distinguished relations (as a whole and not limited to the new tuples) on W are added to $B_X$. Every expression relation $Exp_i$ whose first argument is W is now further populated by evaluating its expression on certain selected nodes from $B_W$. However, not all the nodes in $B_W$ are sent to the XPath processor as context nodes. Even though semi-naive evaluation is used, $B_W$ may well contain values that were in $B_W$ in previous evaluations of the rule, appearing because they constitute a part of newly produced tuples. Therefore, only nodes on which the expression hasn't already been evaluated are sent to the XPath processor. For this, a unary relation $Exp'_i$, which records all the nodes sent to the XPath processor in the context of $exp_i$, is maintained. Note that this is a superset of the first column of $Exp_i$ due to nodes on which the evaluation of $exp_i$ is empty. Then, the XPath predicate is marked as temporarily treated, distinguished variables are recomputed and the algorithm continues. If there are no relevant variables but there is an untreated XPath predicate p (an orphan predicate), the relation corresponding to p is populated by evaluating p's expression on all the nodes in the XML document, which can happen only once for it. The predicate is marked as permanently treated, the set of relevant variables is recomputed and the algorithm continues. Before the next time that the procedure is performed, temporarily treated predicates are marked as untreated. Binding columns are faintly reminiscent of the supplementary relations of the Query-Sub-Query Datalog optimization technique, since they limit the number of nodes sent to the XPath processor. However, unlike Query-Sub-Query, they are formed by intersecting over all relevant projections rather than in a left-to-right order; their calculation is relatively inexpensive.

As for handling negation, the column-based on-demand algorithm is adapted to evaluate queries with negated predicates. First, the definition of a distinguished variable for queries with negation is generalized. X is distinguished at a certain point in time if X is a first variable in an at least one untreated expression relation and appears as an argument in a positive treated predicate. This may add negated predicates to G in the ExtendExpRel procedure. The ExtendExpRel procedure is therefore changed to iterate also on negated predicates in G. Second, the creation of a binding column is done by including only positive relations in D in the CreateBindingCol procedure. The rest of the column-based on-demand algorithm remains unchanged. The result is that an expression relation exp is populated if either predicate $\neg exp(X, Y)$ or predicate $exp(X, Y)$ appear in the body. Third, the algorithm in FIGS. 5a-5b is updated to handle negated predicates by considering only positive predicates p in r. Such expression relation population leads to a correct evaluation of the rule, since the elements in $B_X$ in CreateBindingRule procedure contain all the values of X based on which new tuples may be added to the relation corresponding to the rule's head. Therefore, given a predicate $\neg exp(X, Y)$, exp need not be checked for the absence of two-tuples whose first element is not in $B_X$, because such tuples in Exp necessarily do not support the creation of any new tuple. Since after the call to Populate, no new tuples whose first element is in $B_X$ are added to Exp in this call to ExtendExpRel procedure, the evaluation based on the materialized part of Exp is correct.

Heirarchical data may contain two or more isomorphic subtrees, i.e., subtrees having the same tree structure and the same tags (in the same order). Such subtrees are optionally treated in a manner which takes advantage of their being identical and enables more efficient processing and more succinct programs. Such sub-trees differ in their location in the XML document. For example, consider a document describing basketball players playing in league games, wherein a specific node represents an opening panel in a game. Then a query may relate to all games having the same opening panel. Thus, two distinct nodes in a document have different identity even if the document fragments that they represent are identical (ignoring order of attributes). Such nodes are said to have the same value. Formally, the value of a node v is a unique XML data tree, disjoint from the database tree, which is isomorphic to the tree rooted at v. A Datalog is value oriented. However, the processing of XML motivates considering both the concept of a node's identity and the concept of a node's value. XPath is object oriented, and basically manipulates object ids. Therefore, values are objects of a special kind, as well. A value object has no parent and its descendants, if any, are non-value objects. XPathL queries may use the binary built-in relation val. A tuple (a, b) is in val if a's value is b. In addition, value objects can be queried using expression predicates and their ids can also be stored in relations. Regarding values as objects (as opposed to, for example, the XML fragments themselves with which they are isomorphic) allows for a uniform object model. This in turn allows writing simpler programs that do not have to carry around and process long strings. Using values has several advantages. First, it allows the isolation of subtrees that repeat several times in the XML data, similarly to projection in relational databases. This isolation, in turn, allows for clearer programs. For querying such repeating subtrees, one can query the value viewed as a tree and not worry about possible side-effects that might occur had the query been posed in the context of the original data, such as navigating to portions of the data tree which are not reflected in the value. Once the concept of a value is part of the language, better efficiency can be provided. For example, if it is required to extract from a set S of subtrees elements satisfying a property p (local to the subtree), it is possible to pose a query against all elements in S. However, posing the query to check p on possibly few values, representing the equivalence classes of isomorphic sub-trees, corresponding to the elements in S, suffices. It is unlikely that a query processor will perform such optimization on its own since it needs to determine that the query will provide an isomorphic result for isomorphic subtrees that are located at different parts of the data tree.

Practically, checking for isomorphism of two nodes is linear in the number of nodes in the smaller of the XML subtrees rooted by the nodes. Checking for isomorphisms should be avoided as much as possible. Thus, hash codes are used in order to obtain a "fingerprint" of the value of a node. Then, only nodes having equal hash codes are checked for isomorphism. The hash codes are also useful for the On-Demand approach. Naive assignment of hash codes requires reading and hashing the whole subtree rooted at a node. Instead, an incremental construction of hash codes can be implemented as follows: if a node v has no descendents, its hash code $q(v)$ is the hash code given to its tag (for an element) or text value (for a text node) by a method such as the Java method String.hashCode( ), abbreviated hereinafter as $h(\ )$. If t is v's tag, then $q(v)=h(t)$. If a node v has children $u_1, u_2, \ldots, u_n$, where t is v's tag, $t_i$ is $u_i$'s tag or text value and "+" denotes string concatenation, then $q(v)=h(\ldots h(h(h(t+q(u_1))+q(u_2))+q(u_3))+\ldots+q(u_n))$. In other words, v's tag is concatenated to $q(u_1)$ and $h(\ )$ is applied to the result, which is concatenated to $q(u_2)$, $h(\ )$ is again applied to the result, and so on up to and including $u_n$. The procedure requires limited memory space for computing a single hash code. Val is populated using these hash codes as follows: the XML document is traversed, and every visited node is put into a hash table so that nodes with the same hash code are in the same bucket. After the traversal, only nodes in the same bucket are checked for isomorphism. IDs of isomorphic nodes are inserted into Val with another id which uniquely represents their value. Denote by n a node associated with value node v. Node v is also the value node associated with (non-value) descendants nodes w of value nodes such that n is isomorphic to w. A tuple (w, v) for each such possibility is also inserted to Val. Note that the creation of val is done once for a given XML document. If the same document is queried by different queries, Val needs to be populated only once.

In addition, an on-demand strategy is implemented for populating Val. The strategy uses hash codes in order to minimize checking for isomorphism. The definition of a distinguished variable in the context of expression relations is extended. Given an untreated predicate val(X, Y), X (and respectively Y) is distinguished at a certain point in time if there exists a treated relation with X (respectively, Y) in its schema. The algorithm for ExtendExpRel (rule r) is extended and shown starting on line 513 of FIG. 5A. Set G is created with val predicates with at least one distinguished variable. Binding columns for distinguished variables are created. Assuming a predicate val(X,Y), val is populated in one of two "directions", either according to $B_X$ or to $B_Y$. For an element X in $B_X$, If X's hash code was not yet encountered, X is assigned a new value ID and is inserted with the value ID into val. Otherwise, isomorphism is checked with the other elements that have the same hash code. If an isomorphism, for example X', is found, then X is assigned the value ID already associated with X'. In the other direction, i.e., if the binding column $B_Y$ for the second argument is given, isomorphism is checked for all the nodes which have Y's hash code. Val is populated accordingly. Thus, only values "demanded" by a program are recorded in val.

The subject matter discloses methods and apparatus for evaluating programs comprising both relations and hierarchical predicates. Each type of predicates is handled by a matching process, and the methods and apparatus enable the evaluation of queries in an efficient manner, by using the results returned by one type of processes for reducing the load of the other type. The combination provides a usually faster and more efficient process.

The methods of the disclosure are preferably implemented as computerized components, such as libraries, comprising computer instructions in any computer language. It will be appreciated that the pseudo code provided in association with the figures is illustrative only and can be implemented as computer instructions in a multiplicity of ways without deviating from the spirit of the disclosure.

It will be appreciated by persons skilled in the art that the present invention is not limited to what has been particularly shown and described hereinabove. Rather the scope of the present invention is defined only by the claims which follow.

We claim:

1. A method for evaluating a conjunctive query, the method executed as a computer program by a general purpose computer, the conjunctive query comprising an at least one first predicate having variables; wherein the at least one first predicate is a relational predicate that is evaluated with a first engine using a relational database, and an at least one second predicate having variables, wherein the at least one second predicate is an external predicate that is evaluated using a second engine without using a relational database; the method comprising the steps of:

defining the relational predicates as untreated and defining the external predicates as untreated;

receiving a first algorithm (A) that defines a method of dividing up the external predicates;

extracting external predicates based on the received first algorithm (A) and marking them as treated;

associating the extracted external predicates with untreated relational predicates that appear as variables of the external predicates and indicating the associated relational predicates as treated;

evaluating the extracted external predicates using a second algorithm to produce a result;

repeating said extracting, associating and evaluating for additional sets from the external predicates and performing a join operation on the results.

2. The method of claim 1 wherein the first engine performs an at least one join operation, or an at least one column intersection operation, or handles an at least one relational untreated predicate graph.

3. The method of claim 1 wherein the external predicate is an XML predicate and the external engine is an XPath engine.

4. The method of claim 1 wherein the relational predicate is selected from the group consisting of: a logic predicate having a relational symbol, a relational algebraic expression, an SQL statement, a value predicate, and an expression evaluable against a relational database.

5. The method of claim 1 wherein the external predicate is selected from the group consisting of: a predicate against an XML file expressed in an XML query language, and a predicate against a semantic web database expressed in a semantic web query language.

6. The method of claim 1 wherein said external predicate comprises a hierarchical structure.

7. The method of claim 6 wherein the hierarchical structure is an isomorphic hierarchical structure.

8. The method of claim 1 wherein the first engine or the second engine are activated ad-hoc for evaluating the conjunctive query, or by a system providing the conjunctive query.

9. The method of claim 1 wherein the conjunctive query is part of a computer program.

10. The method of claim 9 wherein the program is an XpathL program or a Datalog program with an at least one external Xpath predicate.

11. The method of claim 9 wherein the program is a recursive program.

12. The method of claim 1, wherein the first algorithm extracts external predicates that appears as a first argument or a second argument of untreated predicates.

13. The method of claim 1, wherein the first algorithm extracts external predicates by random selection.

14. The method of claim 1, wherein the first algorithm extracts external predicates is based on predicate data distribution.

15. An apparatus having a processor and program code for evaluating a conjunctive query, the conjunctive query comprising an at least one first predicate having variables; wherein the at least one first predicate is a relational predicate that is evaluated with a first engine using a relational database, and an at least one second predicate having variables, wherein the at least one second predicate is an external predicate that is evaluated using a second engine without using a relational database, the apparatus comprising:
   a processor;
   a database interface for interfacing with an at least one relational database;
   a relation loader for creating an at least one relation and loading through the database interface an at least one value into the at least one relation from the at least one relational database;
   a parser for parsing the conjunctive query;
   an external processor for evaluating the at least one external predicate; and
   an evaluation manager for evaluating an at least one result returned from the external processor or an at least one result returned from the database interface; and
   wherein the processor of the apparatus is programmed to perform the following to evaluate the conjunctive query:
   defining the relational predicates as untreated and defining the external predicates as untreated;
   receiving a first algorithm (A) that defines a method of dividing up the external predicates;
   extracting external predicates based on the received first algorithm (A) and marking them as treated;
   associating the extracted external predicates with untreated relational predicates that appear as variables of the external predicates and indicating the associated relational predicates as treated;
   evaluating the extracted external predicates using a second algorithm to produce a result;
   repeating said extracting, associating and evaluating for additional sets from the external predicates and performing a join operation on the results.

16. The apparatus of claim 15 wherein the evaluation manager further comprises a rule evaluator for evaluating an at least one rule or an SQL generator for creating an at least one auxiliary query.

17. A non-transitory computer readable storage medium containing a set of instructions for a general purpose computer, to perform the method of claim 1.

18. The method of claim 1 wherein said second algorithm is column based on demand.

* * * * *